No. 851,963. PATENTED APR. 30, 1907.
J. P. ROHN.
CAR FENDER.
APPLICATION FILED DEC. 27, 1906.
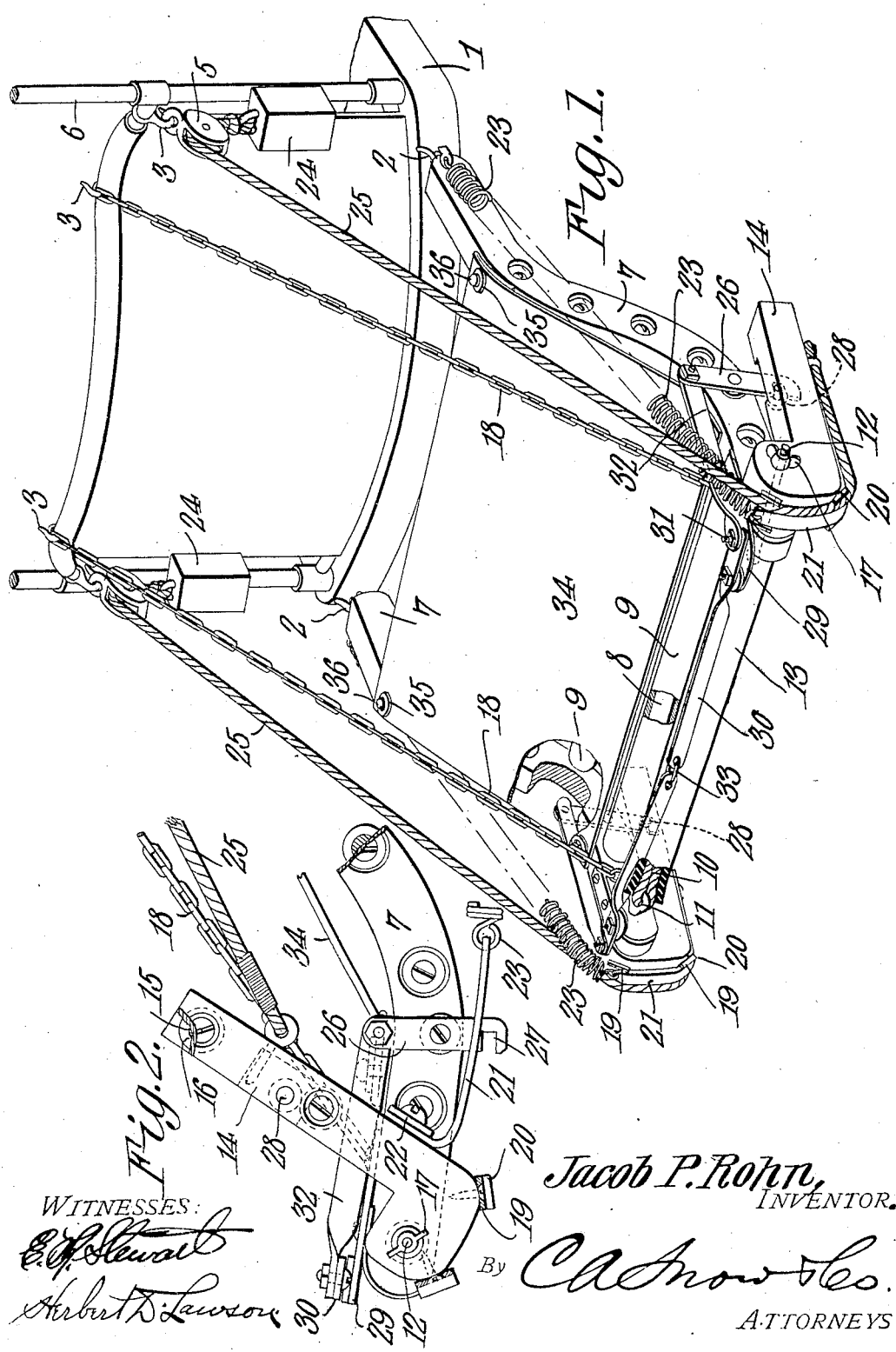
Jacob P. Rohn,
INVENTOR.
WITNESSES:
By C. A. Snow & Co.
ATTORNEYS

UNITED STATES PATENT OFFICE.

JACOB P. ROHN, OF PHILADELPHIA, PENNSYLVANIA.

CAR-FENDER.

No. 851,963.　　　Specification of Letters Patent.　　　Patented April 30, 1907.

Application filed December 27, 1906. Serial No. 349,671.

*To all whom it may concern:*

Be it known that I, JACOB P. ROHN, a citizen of the United States, residing at Philadelphia, in the county of Philadelphia and State of Pennsylvania, have invented a new and useful Car-Fender, of which the following is a specification.

This invention relates to fenders for street cars and its object is to provide a device of this character having means for directing on to the fender any object struck thereby.

A still further object is to provide a fender of this character which can be readily attached to the front of a car and conveniently moved into or out of operative position.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view showing the fender set, a portion thereof being broken away; and Fig. 2 is a side elevation of the front portion of the fender and showing the position assumed by the throwing device after it has been released.

Referring to the figures by characters of reference, 1 is the front platform of a car the same being provided with hooks 2 or other devices by means of which the fender can be attached thereto. Hooks 3 or other securing devices are also secured to the front of the car and pulleys 5 are fastened adjacent the front standards 6 of the car and are for the purpose hereinafter disclosed.

Detachably connected to the hooks 2 are cyma-recta arms 7 constituting the sides of the body of the fender said arms being rigidly connected by cross rods 8 having sleeves or coverings 9 of rubber or other soft material. The arms 7 are connected near their front ends by a strong cord 10 looped through eyes 11 which are formed at the inner ends of bolts 12 extending through the arms 7 and this cord 10 has a sleeve or cover 13 of rubber or other soft material. The bolts 12 constitute pivots for arms 14 constituting the sides of the throwing device and these arms are also connected by cross rods 15 similar to the rods 8 and having flexible coverings 16. Thumb nuts 17 are arranged on the ends of the bolts 12 and by means thereof the cord 10 can be rendered taut. Supporting chains 18 are connected to the arms 7 near their outer ends and are adapted to engage the hooks 3 so as to hold the fender in operative position.

Those ends of the arms 14 adjacent the pivot bolts 12 are enlarged and rounded and secured upon them are guide plates 19 having outstanding flanges 20 at the ends thereof. A band 21 of leather or other material is secured to one face of each arm 14 as shown at 22 and extends around the enlarged end of said arm and between the guide flanges 20, the free end of said band being connected by a strong spring 23 with the upper end of the adjoining arm 7. These bands and springs are so disposed that when the arms 14 are swung downward and then backward under the body of the fender, the springs 23 will become tensioned and will serve to swing the arms forward and upward as soon as they are released. These springs are adapted to be assisted by weights 24 fastened to ropes 25 which are mounted on the pulleys 5 and are fastened to the arms 14 near the bands 21. These ropes also extend around the enlarged ends of arms 14 and between the guide flanges 20.

In order that the throwing device may be held in set position and subsequently released when the fender is brought into contact with an object, mechanism has been provided which consists of locking levers 26 pivoted to the outer sides of arms 7 and having notches 27 adapted to engage lugs 28 extending inwardly from arms 14. Base plates 29 are fastened on the front ends of arms 7 and fulcrumed upon them are inwardly extending tripping levers 30 connected as at 31 with strips 32 which are pivotally connected to the levers 26. The tripping levers 30 extend across the front end of the fender body and adjacent the flexible connection 10 and the adjoining ends of these levers are loosely connected in any preferred manner as by means of a link 33. This link permits a certain amount of oscillatory movement of the levers.

In order that injury to a person caught by the fender may be reduced to the minimum a fabric cover 34 is stretched between the arms 7 and is preferably detachably connected to said arms by providing it with eyes 35 to receive studs 36 extending from the arms.

When it is desired to set the fender the supplemental swinging frame constituting the throwing device is swung downward and backward so that the lugs 28 assume positions to be engaged by levers 26. Said levers are then swung forward into engagement with the lugs by pulling forward on the tripping levers 30. The supplemental or throwing frame will therefore be locked beneath the body of the fender and against the tension of the springs 23. When the fender strikes an object in the path thereof the tripping levers 30 will be pressed backward and cause the levers 26 to release the lugs 28. The tensioned springs 23 and the weights 24 will promptly swing the supplemental frame forward and upward thereby preventing the object from passing under the fender and at the same time lifting it and directing it on to the body of the fender. It will be noted that the front connection between the arms 7 is to a certain extent flexible as shown at 10 and 13 so that an object contacted thereby will not be injured. When it is desired to raise the fender out of operative position it is merely necessary to pull upward on the chains 18.

It will be seen that this fender is comparatively simple in construction and will absolutely prevent objects from passing thereunder after they have been struck thereby. The device can be readily connected to any form of motor car simply by attaching to said car the hooks, etc., which have been indicated upon the drawings. Although the fender has been shown as provided with weights as well as springs for actuating the swinging frame it is to be understood that either the weights or the springs may be dispensed with.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. A car fender comprising a body, a throwing frame movably connected thereto, means for holding the frame against movement, means adapted to be operated by an object contacting with the fender for releasing the throwing frame, and means for swinging the frame, when released, backward into position over the body.

2. A car fender comprising a body, hinged means for throwing thereon an object contacted thereby, and a lock for holding said means against movement, said lock adapted to be contacted and released by the object to be thrown.

3. A car fender comprising a body, a throwing frame hingedly connected thereto and adapted to extend thereunder, means for locking the frame against movement, means operated by contact of an object with the fender for unlocking the frame and means for swinging the frame when unlocked into position over the body.

4. A car fender comprising a body, a throwing device movably connected thereto and normally disposed entirely above the body, means for locking said device in lowered position beneath the body, and means operated by the contact of an object with the fender for unlocking the throwing device.

5. A car fender comprising a body, a throwing device movably connected thereto and adapted to extend thereunder, means for locking said device in position beneath the body, means operated by the contact of the fender with an object for unlocking said device, and means for swinging the frame when unlocked into position entirely over the body.

6. A car fender comprising a body, a throwing device pivotally connected thereto and adapted to extend thereunder, means for locking said device in position beneath the body, means movably mounted upon the body for unlocking the throwing device upon contact with an object, and means for automatically swinging the throwing device in front of and in position entirely over the body when unlocked.

7. A car fender comprising a body consisting of side arms, rigid connections therebetween, a resilient connection between the front portions of the arms, a flexible cover upon the arms and above the rigid connections, and a second resilient connection between the front portions of the arms; and means operated by an object contacting with the fender for throwing said object upon the body.

8. A car fender comprising a body, connected arms pivotally connected to the front portion of the body, locking levers mounted upon the body, means upon the arms for engaging the levers to hold the arms below the body, means carried by the body for actuating the levers to release the arms when the body is contacted by an object, and means for automatically swinging the arms in front of and above the body when released.

9. In a car fender the combination with a body; of a throwing frame hingedly connected to the front end of the body, guides carried by said frame, frame actuating means disposed upon the guides and secured to the frame for swinging the frame when unlocked into position entirely over the body, means for locking the frame against movement by the actuating means, and means operated by the contact of an object therewith for unlocking the frame.

10. In a car fender the combination with a body; of a throwing frame hingedly connected to the front end of the body, guides carried by said frame, frame actuating means disposed upon the guides and secured to the frame for swinging the frame when unlocked into position entirely over the body, locking levers for engaging the frame to hold it against movement by the actuating means, connected tripping levers extending in front of the body and adapted to be actuated by an object contacting therewith, and connections between the tripping and locking levers.

In testimony that I claim the foregoing as my own, I have hereto affixed my signature in the presence of two witnesses.

JACOB P. ROHN.

Witnesses:
　E. HUME TALBERT,
　M. J. WARRINER.